United States Patent
Onishi et al.

(10) Patent No.: US 7,045,737 B2
(45) Date of Patent: May 16, 2006

(54) GLASS-PROCESSING METHOD AND GLASS-PROCESSING APPARATUS FOR THE METHOD

(75) Inventors: Masashi Onishi, Kanagawa (JP); Masaaki Hirano, Kanagawa (JP); Tetsuya Nakanishi, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/780,716

(22) Filed: Feb. 19, 2004

(65) Prior Publication Data

US 2004/0173584 A1    Sep. 9, 2004

(30) Foreign Application Priority Data

Mar. 3, 2003    (JP)    ............................. 2003-056149

(51) Int. Cl.
*B23K 9/00*    (2006.01)

(52) U.S. Cl. ........................... 219/121.55; 219/121.54; 219/121.59; 65/29.19; 65/384

(58) Field of Classification Search ........... 219/121.59, 219/121.43, 121.55, 121.41, 121.47, 121.36, 219/121.54; 65/29.4, 29.12, 29.19, 376, 65/384

See application file for complete search history.

(56) References Cited

U.S. PATENT DOCUMENTS

| | | | |
|---|---|---|---|
| 5,000,771 A | 3/1991 | Fleming, Jr. et al. | |
| 5,397,372 A | 3/1995 | Partus et al. | |
| 5,719,698 A | 2/1998 | Hiraiwa et al. | |
| 6,354,113 B1 * | 3/2002 | Uhm ............................. | 65/484 |
| 6,724,963 B1 * | 4/2004 | Neuberger .................. | 385/123 |
| 6,796,144 B1 * | 9/2004 | Shepard et al. ............ | 65/29.11 |

FOREIGN PATENT DOCUMENTS

| | | |
|---|---|---|
| EP | 0 216 338 A2 | 9/1986 |
| FR | 2 447 890 | 8/1980 |
| GB | 2 062 615 A | 5/1981 |
| JP | 2818735 | 8/1998 |

OTHER PUBLICATIONS

"2.1 RF Induced Thermal Plasma Process.", The R&D Review of Toyota CRDL (Toyota central R&D Labs), vol. 29, No. 3, (Sep. 1994), pp. 61-69 and partial English Translation thereof.

* cited by examiner

*Primary Examiner*—Mark Paschall
(74) *Attorney, Agent, or Firm*—McDermott Will & Emery LLP

(57) ABSTRACT

A glass-processing method adjusts the range of the heating region according to the work piece and processing condition, and a glass-processing apparatus implements the method. The method incorporates the heating of a glass body with a thermal plasma torch comprising (a) a main body provided with a plurality of ports from which a gas issues and (b) a device for applying a high-frequency electric field to the gas fed into the main body. The method comprises the steps of (1) adjusting the plasma flame's size perpendicular to the center axis of the main body by controlling the flow rate of the gas fed into each port according to the size of the glass body, the processing condition, or both and (2) heating the glass body. The apparatus comprises (a) a thermal plasma torch for heating a glass body, comprising (a1) a main body provided with a plurality of ports from which a gas issues and (a2) a device for applying a high-frequency electric field to the gas fed into the main body and (b) a device for adjusting the flow rate of the gas fed into each port.

14 Claims, 10 Drawing Sheets

GLASS-PROCESSING METHOD AND GLASS-PROCESSING APPARATUS FOR THE METHOD

BACKGROUND OF THE INVENTION

1. Field of the Invention

The present invention relates to a method of processing a glass body such as an optical fiber preform and to a glass-processing apparatus for implementing the method.

2. Description of the Background Art

The process of producing an optical fiber preform includes many steps incorporating the heating of a glass body such as the deposition of a glass layer by using the modified chemical vapor deposition process (MCVD process), the unification of a glass rod and a glass pipe by using the rod-in collapsing process, the jointing of a glass rod to be used as the product and a holding rod, and the elongating of a glass rod and a glass pipe.

Conventionally, the heat source for heating the glass body has used a burner that burns a mixed gas of hydrogen ($H_2$) and oxygen ($O_2$) or a mixed gas of propane ($C_3H_8$) and $O_2$. However, when the foregoing heat source is used, substances such as $H_2$ and a hydroxyl group (OH group) sometimes permeate into the glass body and diffuse there. This phenomenon deteriorates the transmission loss of the optical fiber produced from the glass body.

On the other hand, in order to meet the demand for large-capacity transmission, recent optical fibers have a wide light propagating region with a complex refractive-index profile. To form such a region, it is necessary to deposit minute glass particles onto the inner surface of the starting glass pipe by applying the MCVD process for a prolonged time.

In this case, when a burner that burns a gas such as an oxyhydrogen gas is used, the prolonged heating promotes the permeation and diffusion of $H_2$ or an OH group into the starting glass pipe. This causes the deterioration of the transmission loss. To prevent the $H_2$ or OH group from diffusing into the light propagating region, two approaches have been employed; one is to minimize the time for depositing the minute glass particles and the other is to increase the thickness of the starting glass pipe. When the former approach is employed, the upsizing of the optical fiber preform has an undesirable upper limit. When the latter approach is employed, the thermal conduction into the starting glass pipe is impeded, reducing the rate of the formation and deposition of the minute glass particles.

To solve the foregoing problem, researchers and engineers have proposed the heating of the glass body with a thermal plasma torch, which does not use hydrogen atom. The plasma torch has a coil into which a high-frequency current is fed. The tubular main body of a torch made of, for example, silica glass is inserted into the center of the coil. When gases such as argon (Ar) and air are fed into the main body, a plasma flame can be generated according to the size of the main body. U.S. Pat. No. 5,397,372 and the corresponding Japanese patent 2818735 have disclosed a method of producing an optical fiber preform by using a plasma torch in the MCVD process. According to the disclosure, the preform can yield an optical fiber containing only small amounts of impurities such as $H_2$ and an OH group.

Two factors affect the rate of the deposition of the minute glass particles in the MCVD process; one is the yield of forming the minute glass particles and the other is the efficiency for the minute glass particles onto the glass pipe determined by the thermophoretic effect. To increase the rate, it is important to form an optimum heating region for increasing the formation yield and deposition efficiency of the minute glass particles. In addition, it is also required to carry out a good heat processing by forming an optimum heating region while preventing the $H_2$ and OH group from intruding into the glass body in the steps of the unification of a glass rod and a glass pipe, the jointing of a glass rod and a holding rod, and the elongating of a glass rod and a glass pipe. However, in the above-described plasma torch, the intensity of the generated plasma flame is controlled only by the collective adjustment of the flow rate of the gases and the adjustment of power of the high-frequency electric field generated by the coil.

SUMMARY OF THE INVENTION

An object of the present invention is to offer a glass-processing method that adjusts the range of the heating region in accordance with the work piece and/or the processing condition and to offer a glass-processing apparatus for implementing the method.

According to the present invention, the foregoing object is attained by offering the following glass-processing method. The method incorporates the heating of a glass body by using a thermal plasma torch that comprises:
- (a) a main body provided with a plurality of ports from which a gas issues; and
- (b) a device for applying a high-frequency electric field to the gas fed into the main body.

The method comprises the following steps:
- (1) The size of a plasma flame produced by the torch perpendicular to the center axis of the main body of the torch is adjusted by controlling the flow rate of the gas fed into each of the ports in accordance with the size of the glass body, the processing condition, or both.
- (2) The glass body is heated.

According to another aspect of the present invention, the present invention offers the following glass-processing apparatus. The apparatus comprises:
- (a) a thermal plasma torch for heating a glass body, comprising:
  - (a1) a main body provided with a plurality of ports from which a gas issues; and
  - (a2) a device for applying a high-frequency electric field to the gas fed into the main body; and
- (b) a device for adjusting the flow rate of the gas fed into each of the ports.

BRIEF DESCRIPTION OF THE DRAWING

The present invention is illustrated to show examples, not to show limitations, in the figures of the accompanying drawing. In the drawing, the same reference signs and numerals refer to similar elements.

In the drawing.

DETAILED DESCRIPTION OF THE INVENTION

Figure 1:
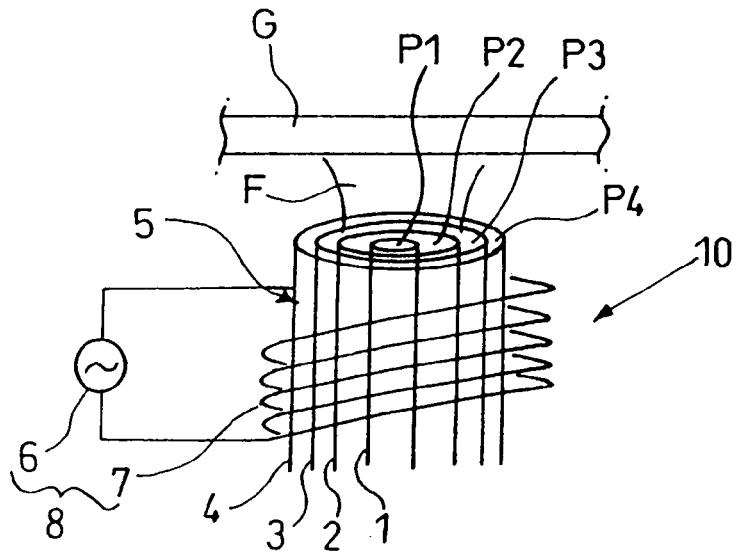
FIG. 1 is a schematic diagram showing an embodiment of the thermal plasma torch to be used in the processing method of the present invention.

FIG. 1 is a schematic diagram showing an embodiment of the thermal plasma torch to be used in the glass-processing method of the present invention.

Figure 2:
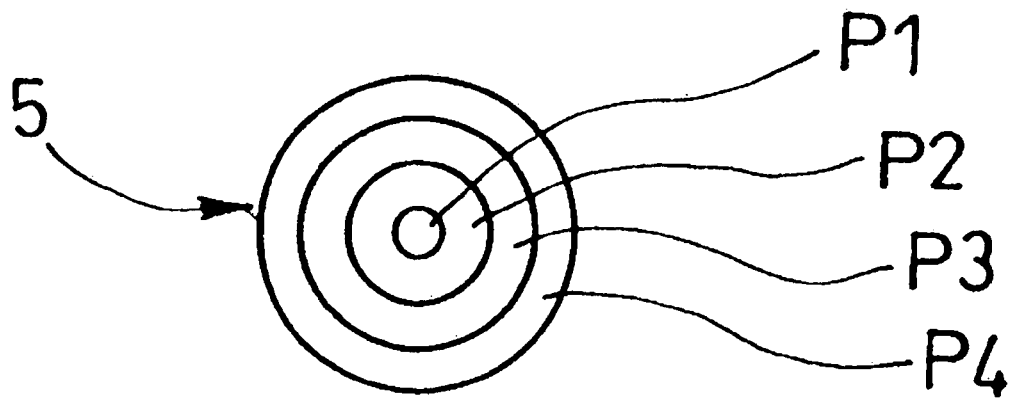
FIG. 2 is a front view of the main body constituting the thermal plasma torch shown in FIG. 1.

FIG. 2 is a front view of the main body constituting the thermal plasma torch shown in FIG. 1. A thermal plasma torch 10 comprises a main body 5 of the torch provided with a plurality of ports P1, P2, P3, and P4 from which a gas issues and a device 8 for applying a high-frequency electric field to the gas fed into the main body 5 of the torch.

The main body 5 of the torch has a multiple-pipe structure in which a plurality of cylindrical pipes 1, 2, 3, and 4 having different diameters are placed concentrically. The pipe 1 and the clearances between the pipes form the ports P1, P2, P3, and P4 respectively. The main body 5 of the torch is surrounded by a coil 7, which is connected to a high-frequency power source 6. The coil 7 and the power source 6 constitute the device 8 for applying a high-frequency electric field. The high-frequency current fed into the coil 7 has a frequency of 13.56 MHz, for example.

Although not shown in the drawing, a gas-feeding line is connected to each of the ports P1, P2, P3, and P4 at the other end of the main body 5 of the torch. The gas-feeding line feeds into each port at least one type of gas of Ar, $O_2$, nitrogen ($N_2$), helium (He), and air. A gas-feeding line may feed into a port a mixed gas comprising at least two types of gases of Ar, $O_2$, $N_2$, He, and air.

When the power source 6 feeds a high-frequency current into the coil 7, a high-frequency electric field is applied to the gases fed into the ports P1, P2, P3, and P4. The high-frequency electric field transforms the gases into plasmas. The plasmas issue from at least one of the ports, forming a plasma flame F.

Because the thermal plasma torch 10 is provided with the multiple ports P1, P2, P3, and P4, whether or not a gas is to be fed into the port can be determined individually and the amount of the gas feeding can be adjusted individually. This individual operation enables the adjustment of the size of the plasma flame F. For example, the smallest plasma flame is generated by feeding the gas only into the central port 1 so that only the port 1 can generate the plasma flame.

As explained above, the thermal plasma torch 10 allows easy adjustment of the size of the generated plasma flame F. As a result, the plasma torch can form a heating region having a suitable range in accordance with the work piece to be heated and the processing condition. As shown in FIG. 1, when a long glass body G is heated, whether or not a gas is to be fed into each individual port is adjusted according to the diameter of the glass body G and the required longitudinal heating length. Thus, a plasma flame F having an optimum size can be generated. Consequently, an intended heating region can be formed to perform a satisfactory glass processing.

Figure 3:
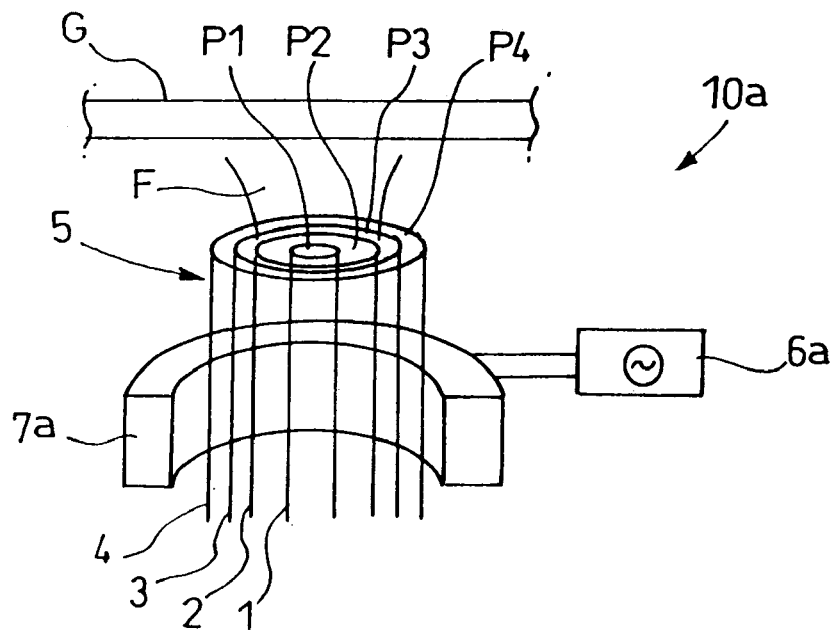
FIG. 3 is a schematic diagram showing another embodiment of the thermal plasma torch to be used in the processing method of the present invention.

FIG. 3 is a schematic diagram showing another embodiment of the thermal plasma torch to be used in the glass-processing method of the present invention. In a thermal plasma torch 10*a*, a main body 5 of the torch is surrounded by an annular resonator 7*a*, which constitutes a part of a device for applying a high-frequency electric field (FIG. 3 shows half of the annular resonator). The resonator 7*a* is connected to a power source 6*a* that can generate a microwave. The resonance of the microwave at the resonator 7*a* enables it to radiate the microwave to the main body 5 of the torch. It is desirable that the microwave has a frequency of 2.4 GHz because a general-use microwave generator can be used as the power source 6*a*.

In the case of the thermal plasma torch 10*a*, also, a plasma flame F is generated by the following process. While the gases are fed into the ports P1, P2, P3, and P4 as intended, the resonator 7*a* radiates a microwave. The radiation ionizes the fed gases, and a plasma flame F is generated at each individual port. The determination of whether or not a gas is to be fed into an individual port and the individual adjustment of the gas-feeding amount enables the adjustment of the size of the generated plasma flame F. Consequently, an intended heating region can be formed to heat the glass body G, so that a satisfactory processing can be performed. The plasma torches 10 and 10*a* allow the adjustment of the frequency and energy of the applied high-frequency electric field so that the temperature of the plasma flame can be controlled.

Figure 4:
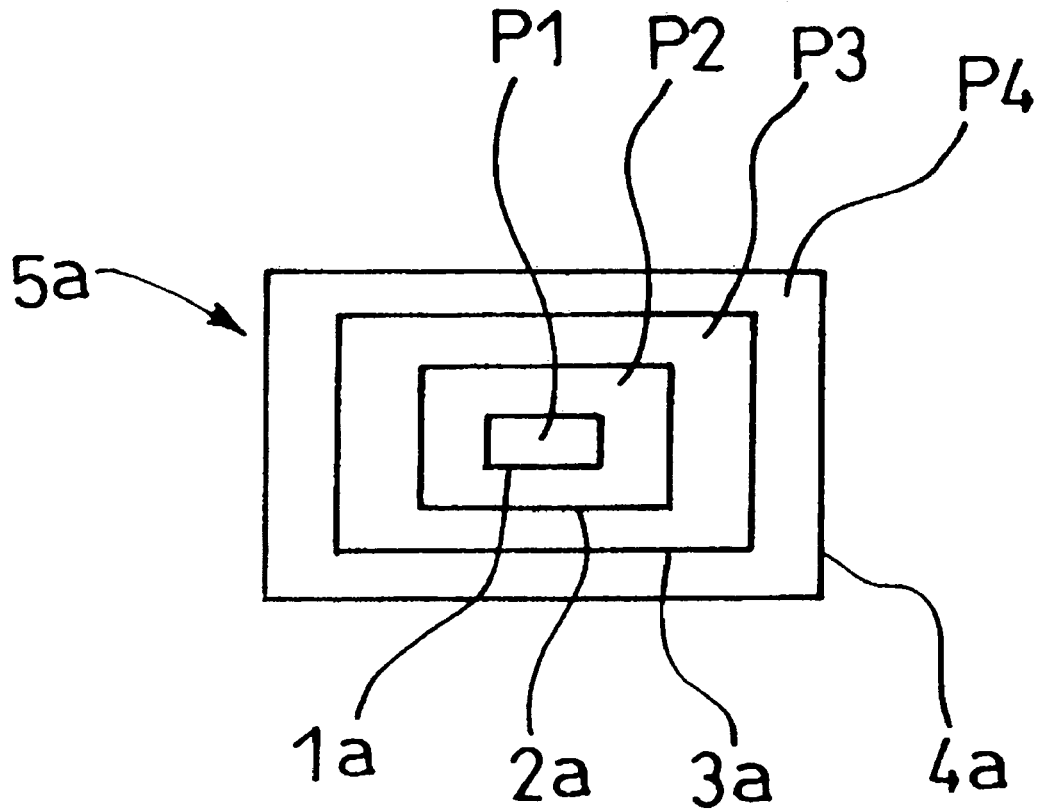
FIG. 4 is a front view of another embodiment of the main body constituting the thermal plasma torch.
Figure 5:
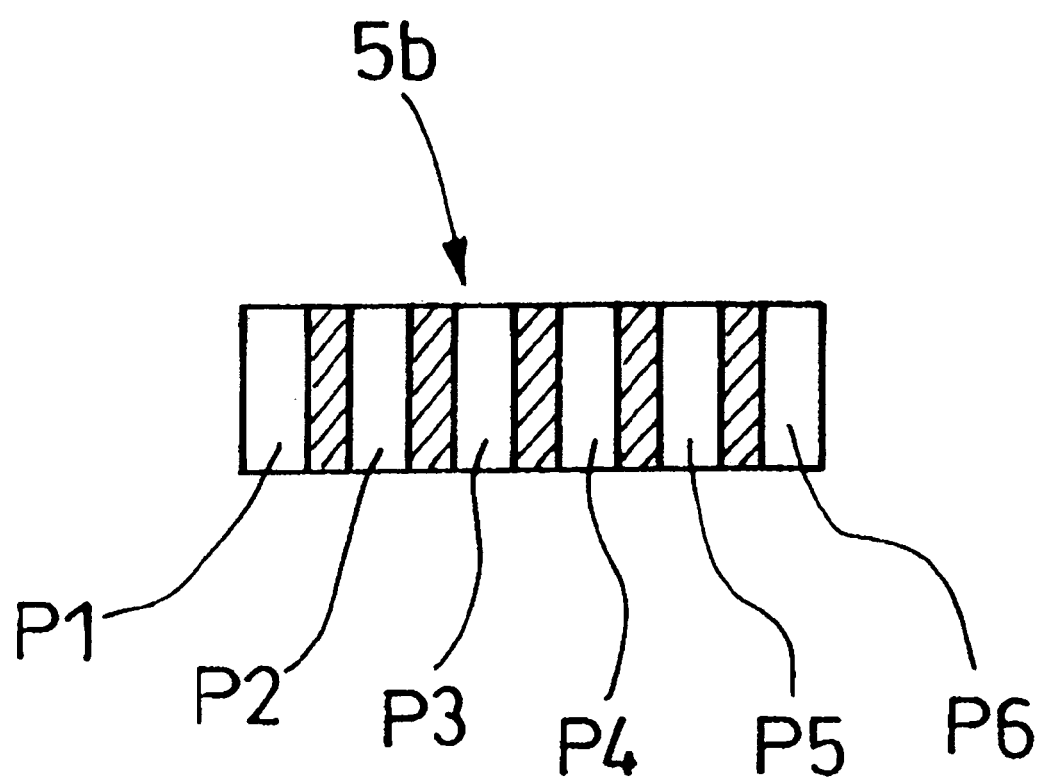
FIG. 5 is a front view of yet another embodiment of the main body constituting the thermal plasma torch.

The structure of the main body 5 of the torch is not limited to those of the foregoing thermal plasma torches 10 and 10*a*. FIGS. 4 and 5 show front views of other embodiments of the main body constituting the plasma torch. FIG. 4 shows a main body 5*a* of the torch in which a plurality of rectangular pipes 1*a*, 2*a*, 3*a*, and 4*a* nest within one another. The central pipe 1*a* and the clearances between the pipes form ports P1, P2, P3, and P4.

FIG. 5 shows a main body 5*b* of the torch in which ports P1, P2, P3, P4, P5, and P6 having the same shape are placed in a row. When the main body 5*b* is used to heat a long glass body, it is recommended to place the main body 5*b* in such a way that the row of the ports is parallel to the glass body.

When the main bodies 5*a* and 5*b* are used, also, the determination of whether or not a gas is to be fed into an individual port and the individual adjustment of the gas-feeding amount enable the adjustment of the size of the generated plasma flame. The size adjustment enables the formation of a heating region having a suitable range in accordance with the work piece to be heated and the processing condition.

It is desirable that the number of ports provided in the main body of the torch be in the range of two to six. In other words, it is desirable to adjust the size of the plasma flame, that is, the heating region, in the range of two to six steps. If the number of ports is more than six, it is difficult for the applied high-frequency electric field to propagate sufficiently into the port located at the central portion. This difficulty may produce the difference in the intensity of the plasma flame between the outer port and the inner port.

Figure 14:
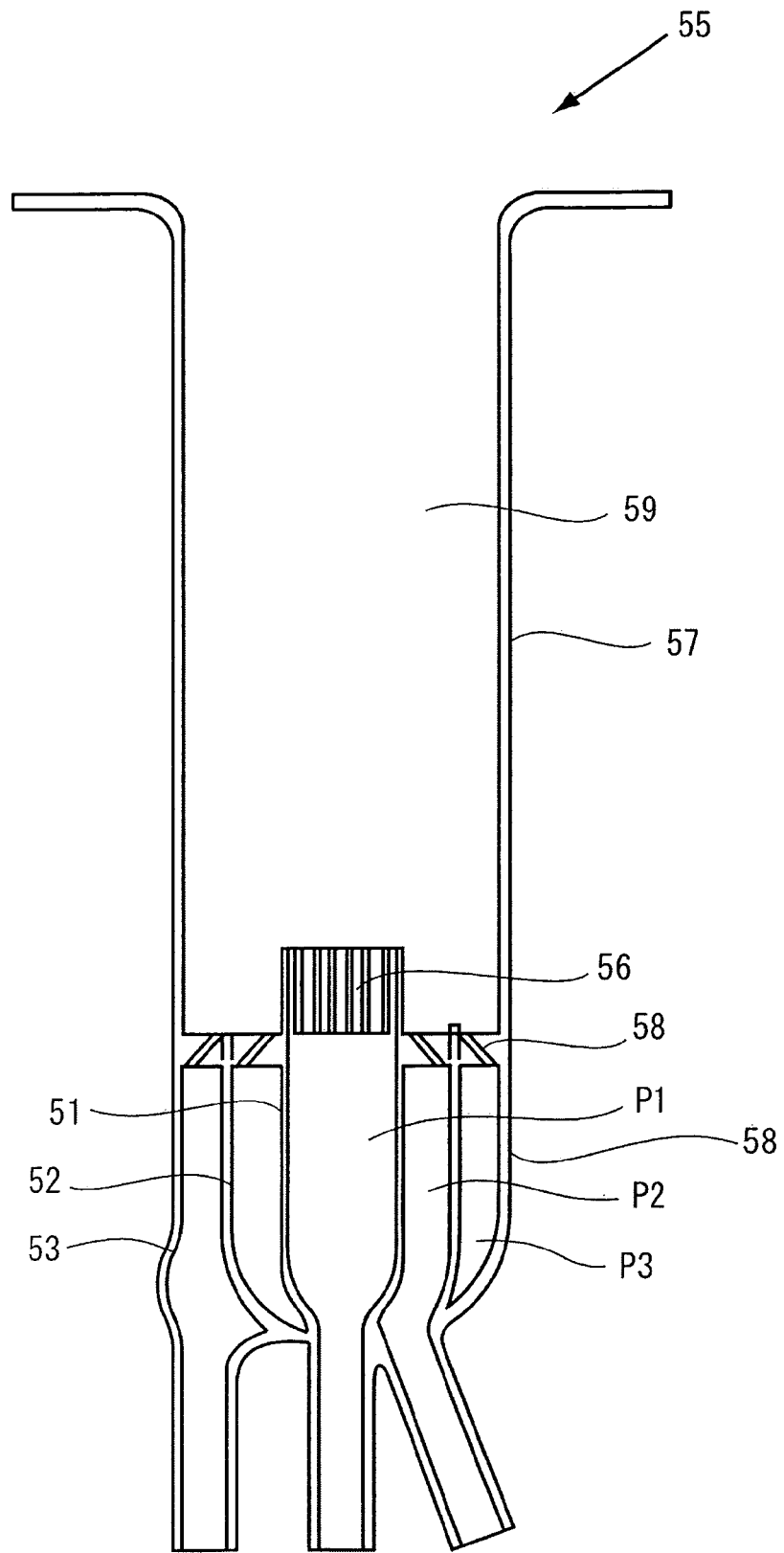
FIG. 14 is a vertical sectional view of yet another embodiment of the main body constituting the thermal plasma torch.

FIG. 14 is a vertical sectional view of yet another embodiment of the main body of the torch. A main body 55 of the torch comprises an upper portion 57 and a lower portion 58. The lower portion 58 of the torch has a multiple-pipe structure in which pipes 51, 52, and 53 having different diameters are placed. The pipe 51 and the clearances between the pipes form the ports P1, P2, and P3. A gas-feeding line is connected to each port. The gas-feeding line feeds into each port at least one type of gas of Ar, $O_2$, $N_2$, He, and air. The port P1 has at its top a parting portion 56 that has small pores with the shape of a honeycomb. This structure allows the gases to issue in a direction parallel to the center axis of the main body 55 of the torch. The port P2 and P3 have at their top a parting portion 56a that has small pores with the shape of a spiral surrounding the center axis. This structure allows the gases to issue with the shape of a spiral surrounding the center axis.

The pipe 53 extends to the upper portion 57 of the torch to form a space 59 for transforming the gas into a plasma. In the space 59, the gas issuing mainly from the port P1 is transformed into a plasma. The gases issuing from the ports P2 and P3 protect the pipe 53 against the plasma by a pinch effect.

Because the main body 55 of the torch is provided with a plurality of ports, the determination of whether or not a gas is to be fed into an individual port and the individual adjustment of the gas-feeding amount enable the adjustment of the size of the plasma flame. For example, when the amount of the gases issuing from the ports P2 and P3 is increased while the amount of the gas issuing from the port P1 is maintained constant, the plasma flame reduces its diameter, increasing the density. Conversely, when the amount of the gas issuing from the port P1 is increased while the amount of the gases issuing from the port P2 and P3 is maintained constant, the plasma flame increases its diameter, increasing the density. It is also possible to adjust the total amount of the gases while the ratios of the amounts of the gases issuing from the ports P1, P2, and P3 are maintained constant. As explained above, the main body 55 of the torch allows easy adjustment of the size of the generated plasma flame. As a result, the thermal plasma torch can form a heating region having a suitable range in accordance with the work piece to be heated and the processing condition.

The main body 55 of the torch has one port that ejects gas streams parallel to one another and two ports that eject gas streams with the shape of a spiral. However, the number of ports is not limited to that employed in the above-described embodiment.

Figure 6:
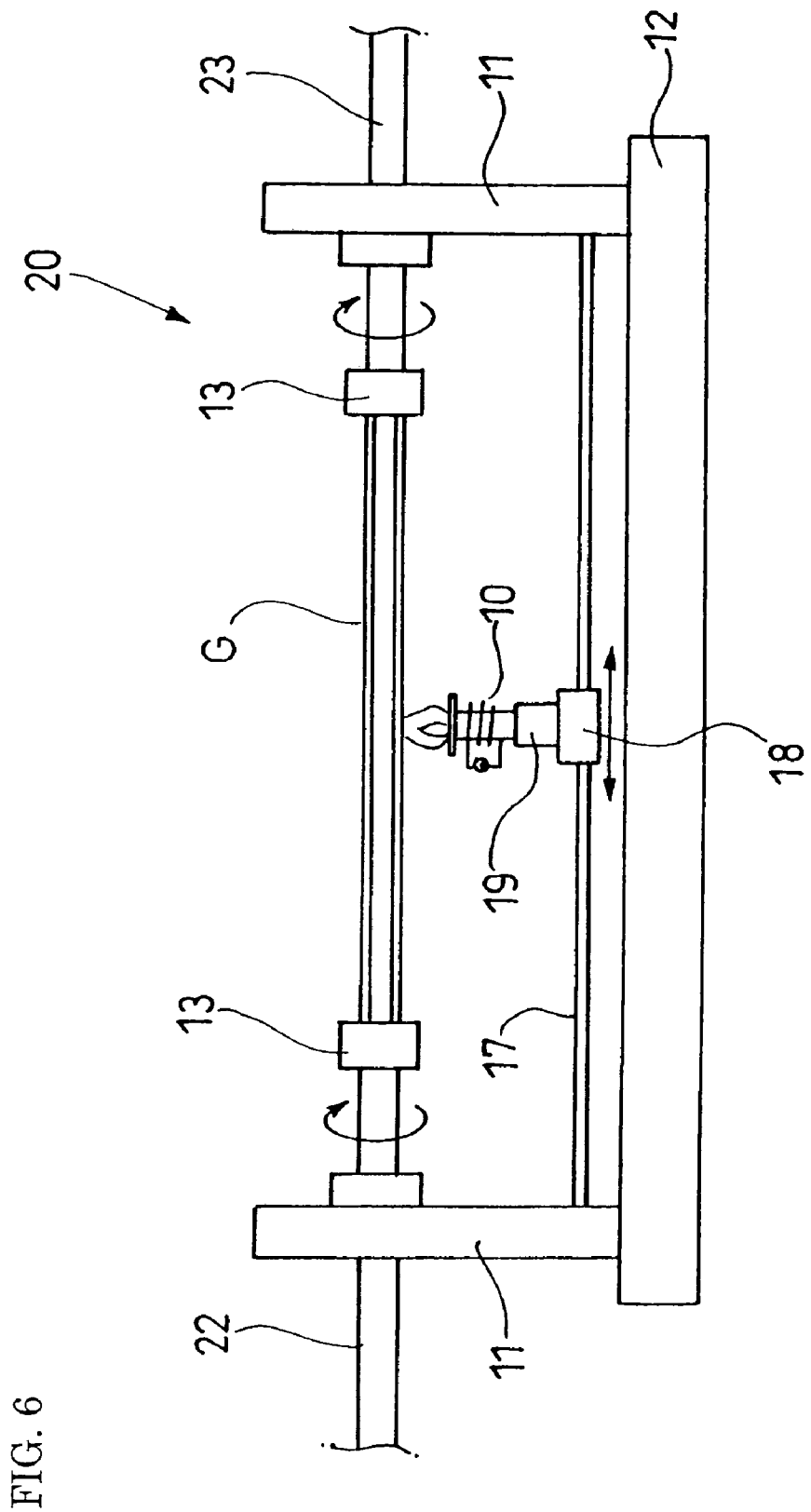
FIG. 6 is a side view of a glass-processing lathe provided with the glass-processing apparatus shown in FIG. 7.
Figure 7:
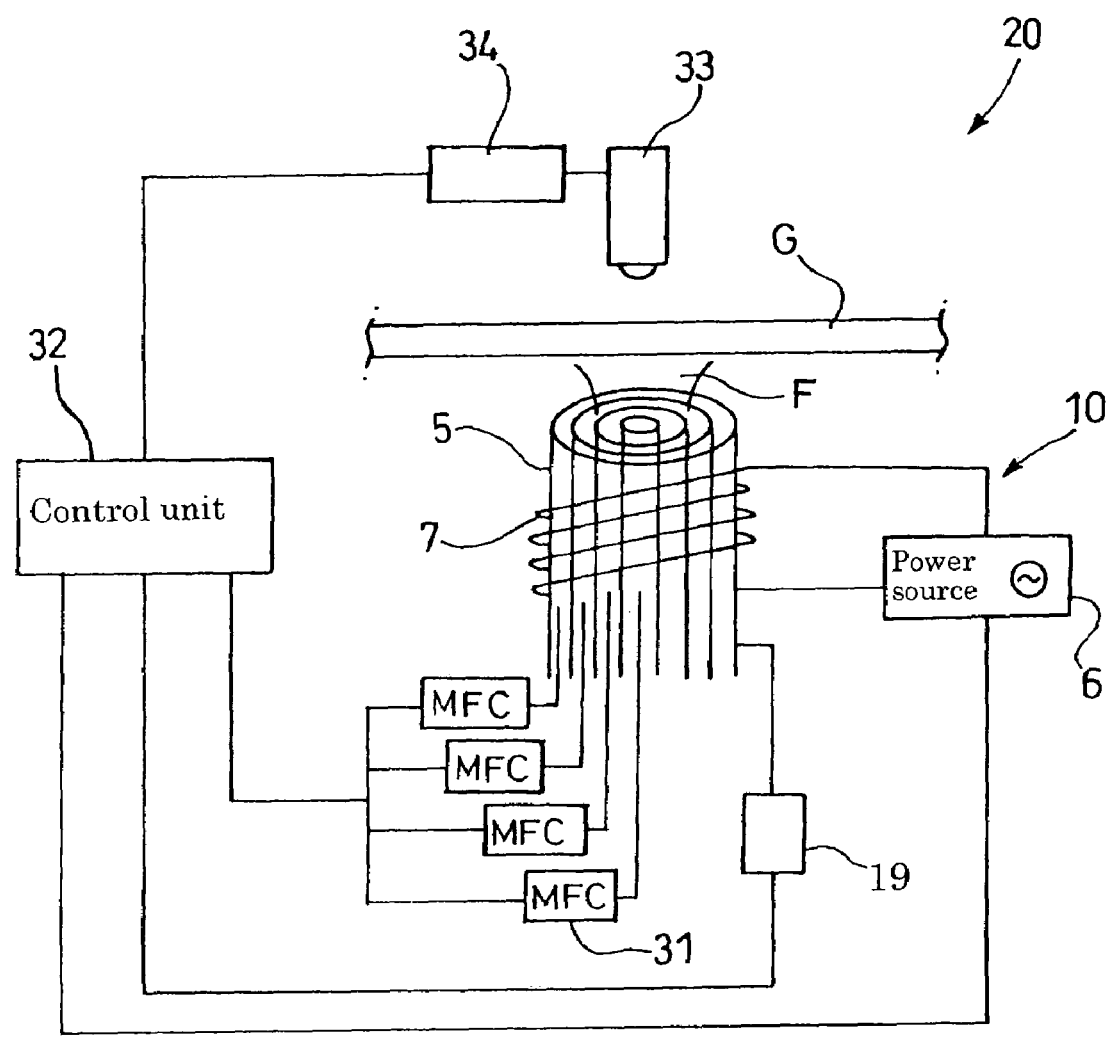
FIG. 7 is a schematic diagram showing an embodiment of the glass-processing apparatus of the present invention.

Next, the glass-processing apparatus of the present invention is explained below. The apparatus comprises (a) a thermal plasma torch for heating a glass body that comprises a main body provided with a plurality of ports from which a gas issues and a device for applying a high-frequency electric field to the gas fed into the main body and (b) a device for adjusting the flow rate of the gas fed into each of the ports. FIG. 7 is a schematic diagram showing an embodiment of the glass-processing apparatus of the present invention. FIG. 6 is a side view of a glass-processing lathe provided with the glass-processing apparatus shown in FIG. 7.

FIG. 6 shows a glass-processing lathe 20 mainly used to implement the MVCD process. The glass-processing lathe 20 is provided with a base stand 12 that bears supporting portions 11 in the vicinity of its both ends. Each of the supporting portions 11 has a rotatable chuck 13. The chucks 13 hold the ends of a glass body, in this case a glass pipe G, to hold it horizontally. A thermal plasma torch 10, which is explained above, for heating the glass pipe G is provided under the glass pipe G held by the chucks 13.

The thermal plasma torch 10 is placed on a movable stand 18 mounted on a supporting rail 17. The movable stand 18 can be moved along the supporting rail 17 with a rack and pinion mechanism. The glass pipe G is placed in a position parallel to the supporting rail 17. A stage 19 (moving device) is placed on the movable stand 18. The stage 19 (moving device) can move the plasma torch 10, which is fixed on the stage 19, forward and backward with respect to the glass pipe G (glass body). In place of the single-shaft stage, which moves the plasma torch forward and backward with respect to the glass body, a triple-shaft stage may be used, which can adjust the position of the torch in a horizontal plane also. A material gas-supplying pipe 22 is connected to one of the supporting portions 11, and a gas-discharging pipe 23 is connected to the other supporting portion 11.

As shown in FIG. 7, the thermal plasma torch 10 is provided with mass flow controllers (MFCs) 31, which adjust the flow rate of the gases fed into the ports P1, P2, P3, and P4.

The glass-processing lathe 20 further comprises the following devices:
(a) a temperature distribution-measuring device 34, which measures the temperature distribution of the glass body; and
(b) a control unit 32, which adjusts the temperature distribution based on the measured temperature distribution by controlling at least one of (b1) the device for applying a high-frequency electric field, (b2) the MFCs 31 (devices for adjusting the flow rate), and (b3) the stage 19 (moving device).

The temperature distribution-measuring device 34 measures the temperature distribution of the glass pipe G based on the signal sent from a radiation thermometer (pyrometer) 33, which detects the temperature of the glass pipe G. The data of the measured temperature distribution is sent to the control unit 32. It is desirable that the temperature distribution be measured to obtain a longitudinal distribution of the surface temperature of the glass pipe G in the region heated by the thermal plasma torch 10. To attain this object, the pyrometer 33 is structured so as to move along the glass pipe G. Consequently, the temperature of the glass pipe G in the heating region can be measured at all times according to the movement of the plasma torch 10.

The control unit 32 is designed to control the power source 6, the moving device 19, and the MFCs 31 based on the data of the temperature distribution sent from the temperature distribution-measuring device 34. When the power source 6 is controlled, it varies the frequency and the energy level of the output to adjust the temperature of the plasma flame F. When the moving device 19 is controlled, it adjusts the relative position between the glass pipe G and the thermal plasma torch 10 to form the heating region at the intended position. In particular, when the distance between the glass pipe G and the plasma torch 10 is adjusted, the heating temperature of the glass pipe G can be adjusted without varying the temperature of the plasma flame F. When the MFCs 31 are controlled, they can not only adjust the size of the plasma flame F by feeding the gas into the intended ports but also adjust the temperature of the plasma flame F by varying the flow rate of the gas.

Next, the glass-processing method of the present invention is explained below. The method incorporates the heating of a glass body by using a thermal plasma torch that comprises (a) a main body provided with a plurality of ports from which a gas issues and (b) a device for applying a high-frequency electric field to the gas fed into the main body. The method comprises the following steps:

(1) The plasma flame's size perpendicular to the center axis of the main body of the torch is adjusted by controlling the flow rate of the gas fed into each of the ports in accordance with the size of the glass body or the processing condition or both.

(2) The glass body is heated.

It is desirable that the gas to be fed be at least one of Ar, $O_2$, $N_2$, He, and air.

The following is the explanation of the deposition of a glass layer through the MCVD process, an embodiment of the glass-processing method of the present invention. In the MCVD process, the glass body is a glass pipe. The heating step comprises the following substeps:

(a) A material gas for forming minute glass particles is introduced into the glass pipe.

(b) The glass pipe is heated with the thermal plasma torch that traverses along the glass pipe to deposit the minute glass particles on the inner surface of the glass pipe.

Figure 8:
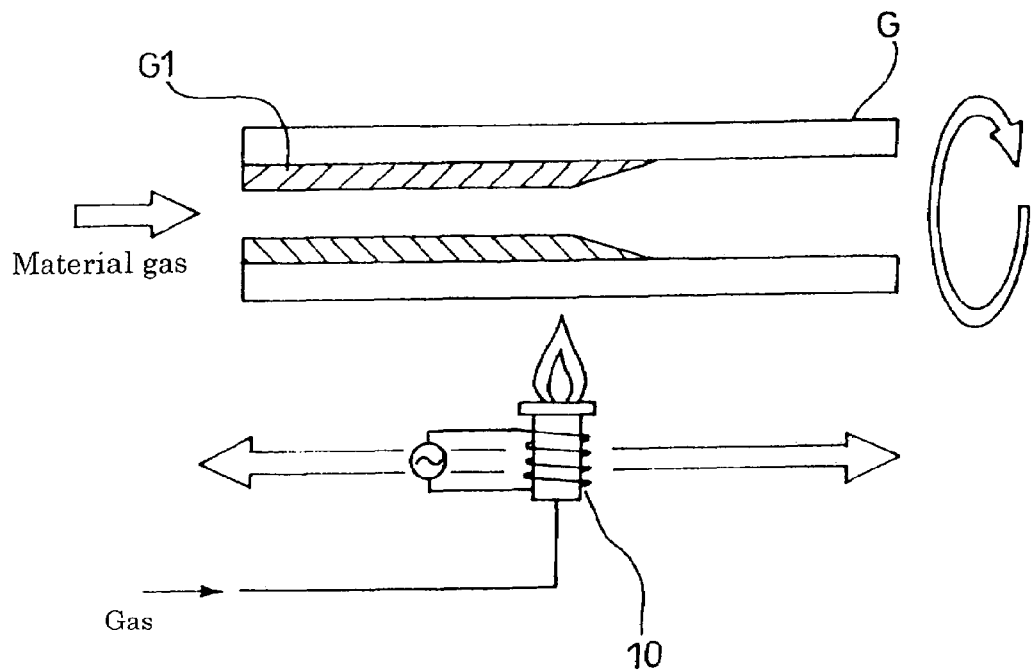
FIG. 8 is a schematic diagram explaining an example of the deposition of a glass layer as an embodiment of the glass-processing method of the present invention.

FIG. 8 is a schematic diagram explaining the MCVD process. The glass pipe G held by the chucks 13 is rotated. A material gas, which is a mixed gas composed of a material for glass such as silicon tetrachloride or germanium tetrachloride and added $O_2$, is supplied into the glass pipe through the material gas-supplying pipe 22. Under this condition, the thermal plasma torch 10 generates a plasma flame F having an intended size. The torch is traversed along the glass pipe a plurality of times.

The plasma flame F heats the glass pipe G to form minute silica-glass particles inside the glass pipe G in the heating region. The thermophoretic effect causes the minute glass particles to adhere and be deposited onto the inner surface of the glass pipe G at the downstream side of the flow of the material gas. The moving thermal plasma torch 10 heats the deposited minute glass particles to consolidate them. Thus, a glass layer G1 is formed successively.

In the MCVD process, it is required to improve the yield of forming the minute glass particles by sufficiently heating the glass pipe G and to improve the thermophoretic effect's efficiency for depositing the glass layer by maintaining the inner surface of the glass pipe G at the downstream side at a relatively low temperature. To meet this requirement in the MCVD process, it is recommended to raise the temperature of the plasma flame F and narrow the heating region.

In this embodiment, the step of adjusting the size of a plasma flame is performed by the following manner. First, the temperature distribution of the glass pipe G (glass body) is measured. Then, the MFCs are controlled based on the measured result of the temperature distribution to control the flow rate of the gas. In particular, in this embodiment, the control unit 32 controls the MFCs 31 based on the data of the temperature distribution sent from the temperature distribution-measuring device 34. More specifically, the control unit 32 determines whether or not a gas is to be fed into an individual port and adjusts the gas-feeding amount individually to adjust the size of the plasma flame. As a result, the glass pipe G is heated with a temperature distribution having a sharp temperature gradient. Thus, the glass layer G1 is formed effectively. When the heating region by the plasma flame F is narrowed, the ionization of small amounts of water, metallic impurities, and other substances contained in the air can be suppressed. Consequently, their permeation and diffusion into the glass pipe G can be suppressed.

After the deposition of the glass layer G1 onto the inner surface of the glass pipe G is repeated to form a plurality of glass layers, the following step is performed.

(4) The glass pipe G is heated again with the plasma flame F of the thermal plasma torch 10 to reduce the diameter so that a solid body can be formed.

(4') Alternatively, after a glass rod is inserted into the center of the glass pipe G, the glass pipe G is heated with the plasma flame F to reduce the diameter so that the glass pipe G is unified with the glass rod to form a solid body.

In this case, it is desirable to perform the following step in succession to the step of depositing the glass layer G1.

(3) The size of the plasma flame is adjusted again.

In this case, the control unit 32 controls the MFCs 31 again based on the data of the temperature distribution sent from the temperature distribution-measuring device 34. More specifically, the control unit 32 determines whether or not a gas is to be fed into an individual port and adjusts the gas-feeding amount individually to adjust the temperature and heating region of the plasma flame F so that the formation of a solid body can be performed properly. In the step of forming a solid body, it is desirable to reduce the temperature of the plasma flame F and widen the heating region. As a result, the glass pipe G reduces its diameter uniformly along the length, enabling a uniform formation of a solid body.

In this embodiment, the amounts of the gases fed into the ports P1, P2, P3, and P4 of the thermal plasma torch 10 are adjusted individually. In place of this method, a different type of gas may be fed into a different port to adjust the heating region and temperature of the plasma flame. In this case, the type of gas to be fed is selected so that the intended temperature distribution can be attained in accordance with the size of the glass body to be processed and the processing condition.

The information to be fed back is not limited to the temperature distribution of the glass pipe G. It is possible to feed back the data that may vary according to each traverse of the thermal plasma torch 10, such as the outer and inner diameters of the glass pipe G and the thickness of the glass layer G1. In addition, besides the MFCs 31, the control unit 32 may control the device 8 for applying a high-frequency electric field in order to adjust the frequency and energy of the high-frequency electric field and the moving device 19 in order to adjust the distance between the glass pipe G and the plasma torch 10. By controlling these devices, the control unit 32 can adjust the temperature of the plasma flame F and the relative position between the glass pipe G and the plasma torch 10 so that the glass pipe G can be heated with an intended temperature distribution.

To attain easy control of the temperature distribution through the adjustment of the gas flow rate by the MFCs, it is desirable that the gas flow at the ports P1, P2, P3, and P4 in the thermal plasma torch 10 be a laminar or similar flow. In this case, it is desirable that the gas flow has a Reynolds number of 2,000 to 3,000.

Figure 9:
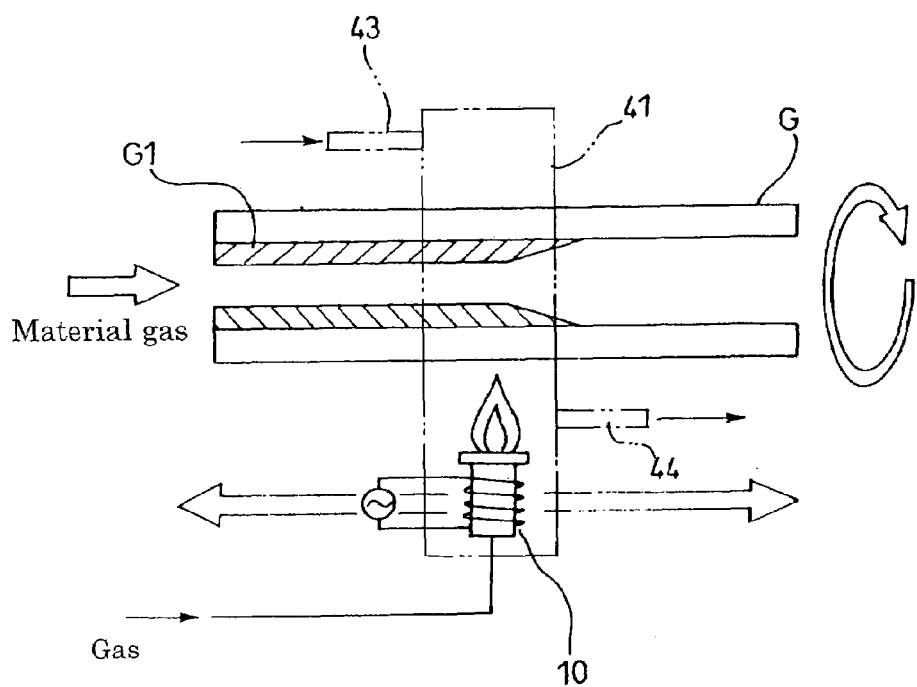
FIG. 9 is a schematic diagram explaining another example of the deposition of a glass layer as an embodiment of the glass-processing method of the present invention.
Figure 10:
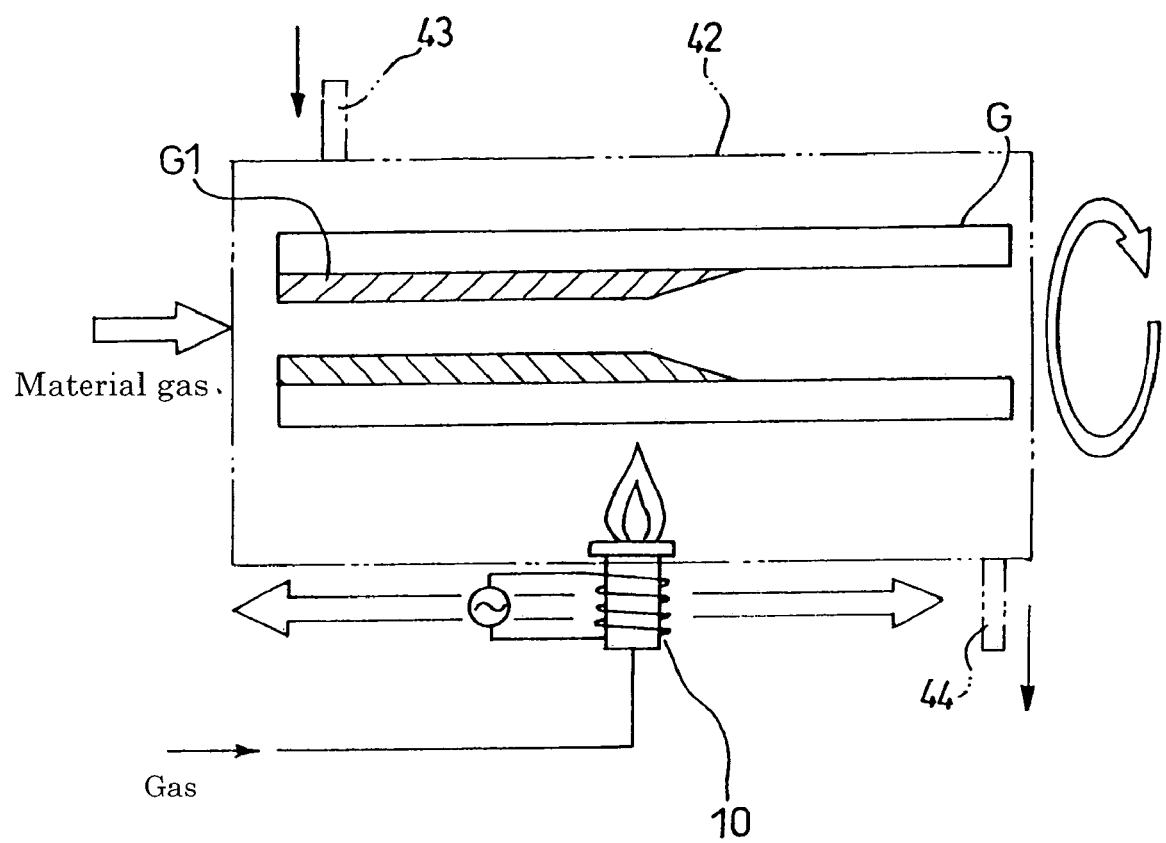
FIG. 10 is a schematic diagram explaining yet another example of the deposition of a glass layer as an embodiment of the glass-processing method of the present invention.

FIGS. 9 and 10 are schematic diagrams showing a glass-processing method that is intended to reliably prevent small amounts of water and the ions of metallic impurities and other substances contained in the air from intruding into the glass pipe G in the step of depositing the glass layer G1. FIG. 9 shows a method that provides a cover 41 to cover the thermal plasma torch 10 and only the heating region of the glass pipe G. FIG. 10 shows a method that provides a cover 42 to cover the plasma flame F of the plasma torch 10 and the entire glass pipe G. The covers 41 and 42 are not necessarily required to cover the entire plasma torch 10. As shown in FIG. 10, the cover has only to cover the plasma flame F.

The covers 41 and 42 are provided with a gas-introducing port 43 and a gas-discharging port 44. During the heating process, a dry gas is introduced to surround the heating region of the glass pipe G with a clean atmosphere having little water vapor. It is desirable that the dry gas be a clean inert gas, such as $N_2$, Ar, or helium, having a metallic-impurity concentration of at most 1 ppm. It is desirable that the dry gas have a dew point of at most 0° C., more desirably at most −50° C.

The glass-processing apparatus having the above-described structure can eliminate water vapor and impurities from the atmosphere around the plasma flame F. Consequently, it can reliably prevent the impurity from intruding into the glass pipe G in the step of depositing the glass layer G1. In addition, when an optical fiber preform is produced with the glass-processing apparatus 20, it is desirable that the gas to be fed into the thermal plasma torch 10 be a dry gas having a dew point as low as at most 0° C., more desirably at most −50° C., as described above. This action more reliably prevents the permeation of water vapor into the glass pipe G.

Figure 11:
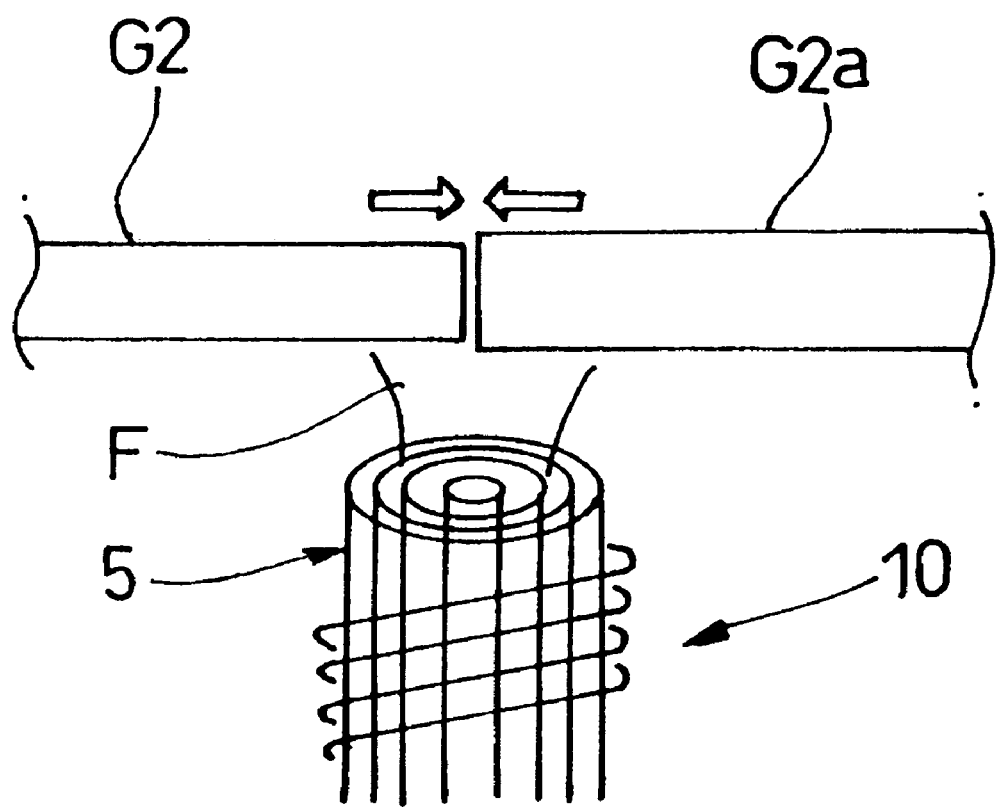
FIG. 11 is a schematic diagram explaining the jointing of glass rods as another embodiment of the glass-processing method of the present invention.

The glass-processing method of the present invention can also be applied to various glass-processing operations, such as mutual jointing between glass rods, between glass pipes, and between a glass rod and glass pipe, the elongating of an optical fiber preform and other glass bodies, flame polishing, and strain removing. FIG. 11 is a schematic diagram explaining the jointing of glass rods as another embodiment of the glass-processing method of the present invention. When glass rods G2 and G2a are mutually jointed, the jointing end faces of the glass rods G2 and G2a are heated and softened with the plasma flame F of the thermal plasma torch 10 to be butted to each other.

Figure 12:
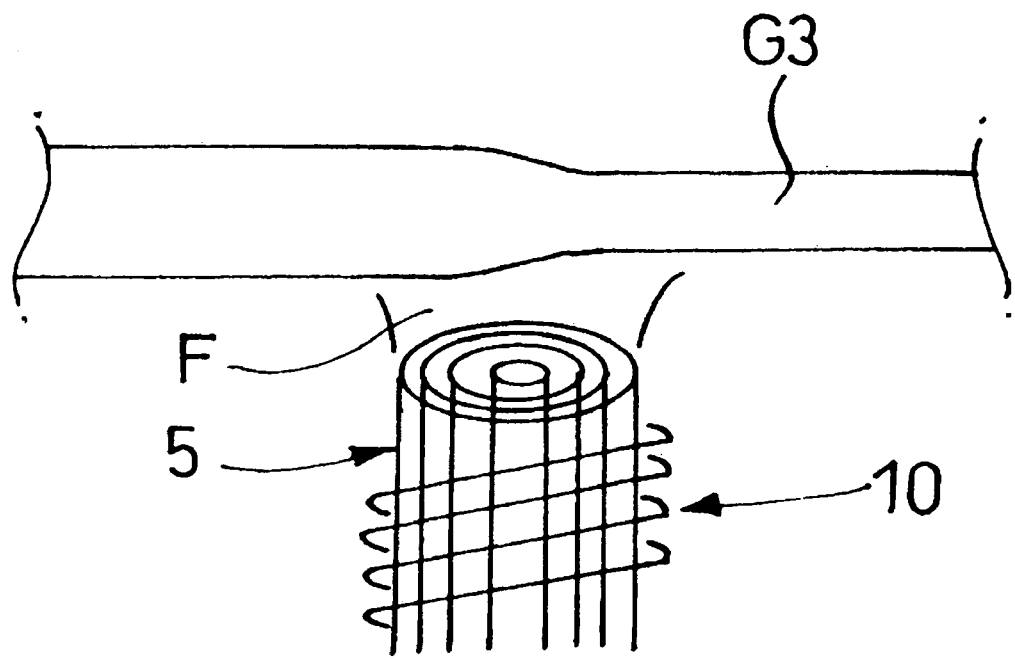
FIG. 12 is a schematic diagram explaining the elongating of a glass rod as yet another embodiment of the glass-processing method of the present invention.

FIG. 12 is a schematic diagram explaining the elongating of a glass rod as yet another embodiment of the glass-processing method of the present invention. When a glass rod G3 is elongated, while being rotated on its own axis, the glass rod G3 is heated with the plasma flame F of the thermal plasma torch 10 to be elongated at a specified tension.

Figure 13:
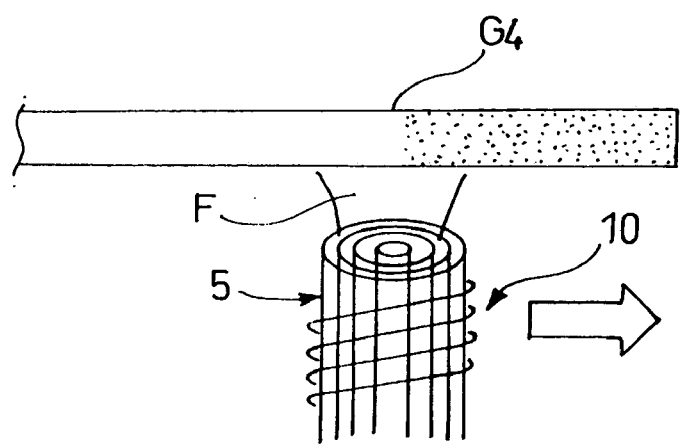
FIG. 13 is a schematic diagram explaining the flame polishing of a glass rod as yet another embodiment of the glass-processing method of the present invention.

FIG. 13 is a schematic diagram explaining the flame polishing of a glass rod as yet another embodiment of the glass-processing method of the present invention. When a glass rod G4 is flame-polished, while being rotated on its own axis, the glass rod G4 is heated along its length with the plasma flame F of the thermal plasma torch 10. This heating gasifies a glass layer on the surface of the glass rod G4, so that roughness, minute flaws, strain, and adhering foreign matters can be removed.

The above-described thermal plasma torch 10 can adjust the heating region of the plasma flame in accordance with the diameter of the glass body and the required heating length even for performing the above-described jointing, elongating, and flame polishing. As a result, these operations can be successfully performed with the permeation of impurity being suppressed. In particular, when the jointing is performed, only the jointing portions are adequately heated with high efficiency. Consequently, the permeation of impurity into the glass rod can be significantly suppressed.

EXAMPLE 1

A silica-glass pipe having an outer diameter of 34 mm and an inner diameter of 26 mm was heated with the glass-processing lathe 20 provided with the main body 55, shown in FIG. 14, of the torch whose upper portion has a diameter of 80 mm. The heating was carried out under the following conditions:
 Number of rotations of the silica-glass pipe: 90 rpm
 Moving speed of the main body of the torch: 100 mm/min
 Gas fed into the main body of the torch: dry air
 High-frequency power: 30 kW
 Frequency of the power: 3 MHz.

The flow rates V1, V2, and V3 of the gas fed into the ports P1, P2, and P3, respectively, were varied, and the temperature of the silica-glass pipe was measured with a pyrometer for individual cases. Table I shows the maximum temperature and the length of the portion heated at 1,700° C. or more (magnitude of the heat zone length). As can be seen from Table I, the maximum temperature and the magnitude of the heat zone length can be adjusted by varying the flow rate of the gas fed into the individual port.

TABLE I

| V1 (SLM) | V2 (SLM) | V3 (SLM) | Maximum temperature (° C.) | Heat zone (mm) |
|---|---|---|---|---|
| 20 | 10 | 10 | 2,250 | 93 |
|  | 10 | 15 | 2,260 | 93 |
|  | 25 | 20 | 2,230 | 92 |
|  | 30 | 30 | 2,350 | 89 |
| 30 | 10 | 10 | 2,270 | 93 |
|  | 10 | 15 | 2,300 | 98 |
|  | 25 | 20 | 2,290 | 92 |
|  | 30 | 30 | 2,335 | 92 |
| 40 | 10 | 10 | 2,300 | 90 |
|  | 10 | 15 | 2,330 | 101 |
|  | 25 | 20 | 2,310 | 89 |
|  | 30 | 30 | 2,320 | 83 |
| 50 | 10 | 10 | — | — |
|  | 10 | 15 | 2,340 | 95 |
|  | 25 | 20 | 2,330 | 92 |
|  | 30 | 30 | 2,320 | 83 |
| 60 | 10 | 10 | — | — |
|  | 10 | 15 | — | — |
|  | 25 | 20 | 2,330 | 89 |
|  | 30 | 30 | 2,310 | 77 |

SLM: standard litter per minute

EXAMPLE 2

This example studied the effects of the heat source used in the MCVD process on the amount of the water diffused in the glass and the transmission loss of the produced optical fiber. Eleven silica-glass pipes were used which had an outer diameter of 34 mm and an inner diameter of 28 mm and contained 0.3 wt. % chlorine (Cl). Glass having a relative refractive index difference larger than the silica-glass pipe by 0.4 percentage was deposited on the inner surface of each silica-glass pipe by using the MCVD process. For 10 pipes, a plasma flame was used as the heat source and the dew point of the gas fed into the thermal plasma torch was varied for each individual pipe. For the remaining one pipe, an oxyhydrogen flame was used as the heat source for comparison. In both cases, after 40 layers were deposited at a rate of 1 g/min, the silica-glass pipe was collapsed by the heating in an induction furnace. Thus, glass rods having a core-cladding structure were produced. A part of each glass rod was sliced to measure by the microscopic FT-IR spectrometer the concentration of the OH group contained in the surface portion of the glass rod.

Furthermore, the glass rod was combined with another glass pipe having a thickness 1.85 times the diameter of the glass rod. The glass pipe was collapsed to form an optical fiber preform. The preform was drawn to produce an optical fiber. The transmission loss at 1.38 μm ($\alpha_{1.38}$) and the intensity of the OH absorption ($\Delta\alpha_{OH}$) of the optical fiber were measured. The measured results are shown in Table II. The optical fiber had the following characteristics at 1.55 μm: chromatic dispersion: +17 ps/nm/km; dispersion slope: +0.06 ps/nm²/km; transmission loss: 0.186 dB/km; and $A_{eff}$: 75 μm².

TABLE II

| Heat source | Dew point (° C.) | Concentration of OH group (wt. ppm) | $\alpha_{1.38}$ (dB/km) | $\Delta\alpha_{OH}$ (dB/km) |
|---|---|---|---|---|
| Plasma | 30 | 259 | 0.559 | 0.294 |
| | 10 | 162 | 0.449 | 0.184 |
| | 3 | 137 | 0.420 | 0.155 |
| | 0 | 114 | 0.394 | 0.129 |
| | −15 | 71 | 0.345 | 0.080 |
| | −20 | 69 | 0.343 | 0.078 |
| | −34 | 47 | 0.318 | 0.053 |
| | −51 | 23 | 0.291 | 0.026 |
| | −61 | 20 | 0.288 | 0.023 |
| | −84 | 19 | 0.287 | 0.022 |
| Oxyhydrogen | — | 900 | 1.29 | 1.02 |

EXAMPLE 3

Optical fibers different from those used in Example 2 were used to study the effect of the heat source used in the MCVD process on the transmission loss of the produced optical fiber. The deposition of the glass layers through the MCVD process was performed by the same method as in Example 2. In Example 2, the glass pipe whose inner surface had deposited glass layers was collapsed without further preparation. In contrast, in Example 3, the glass pipe after the glass-layer deposition was combined with a glass rod whose central region had a relative refractive-index difference of 0.5% and whose peripheral region had a relative refractive-index difference of −0.4%. The glass pipe was collapsed to form a glass rod having a core-trench-ridge-cladding structure.

Furthermore, the glass rod was combined with another glass pipe having a thickness 1.9 times the diameter of the glass rod. The glass pipe was collapsed to form an optical fiber preform. The preform was drawn to produce an optical fiber. The loss at 138 μM ($\alpha_{1.38}$) and the intensity of the OH absorption ($\Delta\alpha_{OH}$) of the optical fiber were measured. The measured results are shown in Table III. The optical fiber had the following characteristics at 1.55 μm: chromatic dispersion: +6 ps/nm/km; dispersion slope: +0.03 ps/nm²/km; transmission loss: 0.19 dB/km; and $A_{eff}$: 50 μm².

TABLE III

| Heat source | Dew point (° C.) | $\alpha_{1.38}$ (dB/km) | $\Delta\alpha_{OH}$ (dB/km) |
|---|---|---|---|
| Plasma | 30 | 0.537 | 0.262 |
| | 10 | 0.439 | 0.164 |
| | 3 | 0.414 | 0.139 |
| | 0 | 0.390 | 0.115 |
| | −15 | 0.347 | 0.072 |
| | −20 | 0.345 | 0.070 |
| | −34 | 0.323 | 0.048 |
| | −51 | 0.298 | 0.023 |
| | −61 | 0.295 | 0.020 |
| | −84 | 0.294 | 0.019 |
| Oxyhydrogen | — | 1.185 | 0.910 |

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2003-056149 filed on Mar. 3, 2003 including the specification, claims, drawing, and summary is incorporated herein be reference in its entirety.

What is claimed is:

1. A glass-processing method incorporating the heating of a glass body by using a thermal plasma torch that comprises:
    (a) a main body provided with a plurality of ports from which a gas issues; and
    (b) a device for applying a high-frequency electric field to the gas fed into the main body;
    the method comprising the steps of:
    (1) adjusting the size of a plasma flame produced by the torch perpendicular to the center axis of the main body of the torch by controlling the flow rate of the gas fed into each of the ports in accordance with at least one of (1a) the size of the glass body and (1b) the processing condition; and
    (2) heating the glass body, wherein:
    (a) a gas to be transformed into a plasma is fed into a port or ports positioned at the inner portion of the arrangement of the ports:
    (b) a gas to be used as a sealing gas is fed into a port or ports positioned at the outer portion of the arrangement of the ports, and
    (c) in the step of adjusting the size of a plasma flame, the size is adjusted by varying the flow rate between the gas to be transformed into a plasma and the gas to be used as a sealing gas.

2. A glass-processing method as defined by claim 1, wherein the gas to be fed into each of the ports has the same composition.

3. A glass-processing method as defined by claim 1, wherein:
    (a) as the gas, at least two types of gases are used; and
    (b) each of the at least two types of gases is fed into a different port from one another in the ports.

4. A glass-processing method as defined by claim 1, wherein the glass body is an optical fiber preform.

5. A glass-processing method as defined by claim 1, wherein:
    (a) the glass body is a glass pipe; and
    (b) the step of heating the glass pipe comprises the substeps of:
    (b1) introducing into the glass pipe a material gas for forming minute glass particles; and
    (b2) heating the glass pipe with the thermal plasma torch that relatively traverses along the glass pipe to deposit the minute glass particles on the inner surface of the glass pipe.

6. A glass-processing method as defined by claim 5, the method further comprising, in succession to the step of heating the glass pipe, the steps of:
    (3) adjusting the size of the plasma flame again; and
    (4) heating the glass pipe to form a solid body.

7. The method according to claim 1, comprising heating the glass body from outside of the glass body.

8. A glass-processing method as defined by claim 1 wherein said sealing gas comprises two types of gases, each of which is fed into a different port from one another in the port positioned at the outer portion of the arrangement of the ports.

9. A glass-processing method incorporating the heating of a glass body by using a thermal plasma torch that comprises:
 (a) a main body provided with a plurality of ports from which a gas issues; and
 (b) a device for applying a high-frequency electric field to the gas fed into the main body; the method comprising the steps of:
 (1) adjusting the size of a plasma flame produced by the torch perpendicular to the center axis of the main body of the torch by controlling the flow rate of the gas fed into each of the ports in accordance with at least one (1a) the size of the glass body and (1b) the processing condition; and
 (2) heating the glass body,
 wherein in the step of adjusting the size of a plasma flame, the controlling of the flow rate of the gas is performed through the substeps of:
 (a) measuring the temperature distribution of the glass body; and
 (b) controlling the flow rate based on the measured result of the temperature distribution.

10. A glass-processing method as defined by claim 1 or 9, wherein the gas is at least one of argon, oxygen, nitrogen, helium, and air.

11. A glass-processing method as defined by claim 1 or 9, wherein the gas has a dew point of at most 0° C.

12. A glass-processing method as defined by claim 11, wherein the gas has a dew point of at most −50° C.

13. A glass-processing apparatus comprising:
 (a) a thermal plasma torch for heating a glass body, comprising:
 (a1) a main body provided with a plurality of ports from which a gas issues, and
 (a2) a device for applying a high-frequency electric field to the gas fed into the main body; and
 (b) a device for adjusting the flow rate of the gas fed into each of the ports,
 (c) a moving device capable of moving the thermal plasma torch forward and backward with respect to the glass body,
 (d) a device for measuring the temperature distribution of the glass body; and
 (e) a control unit for adjusting the temperature distribution based on the measured temperature distribution by controlling at least one of (e1) the device for adjusting the flow rate, and (e2) the moving device.

14. The apparatus according to claim 13, wherein the plasma torch is positioned to heat the glass body from outside of the glass body.

* * * * *